March 15, 1938.  D. F. LINSLEY  2,110,994
AUTOMOTIVE VEHICLE
Filed April 3, 1936  2 Sheets-Sheet 1
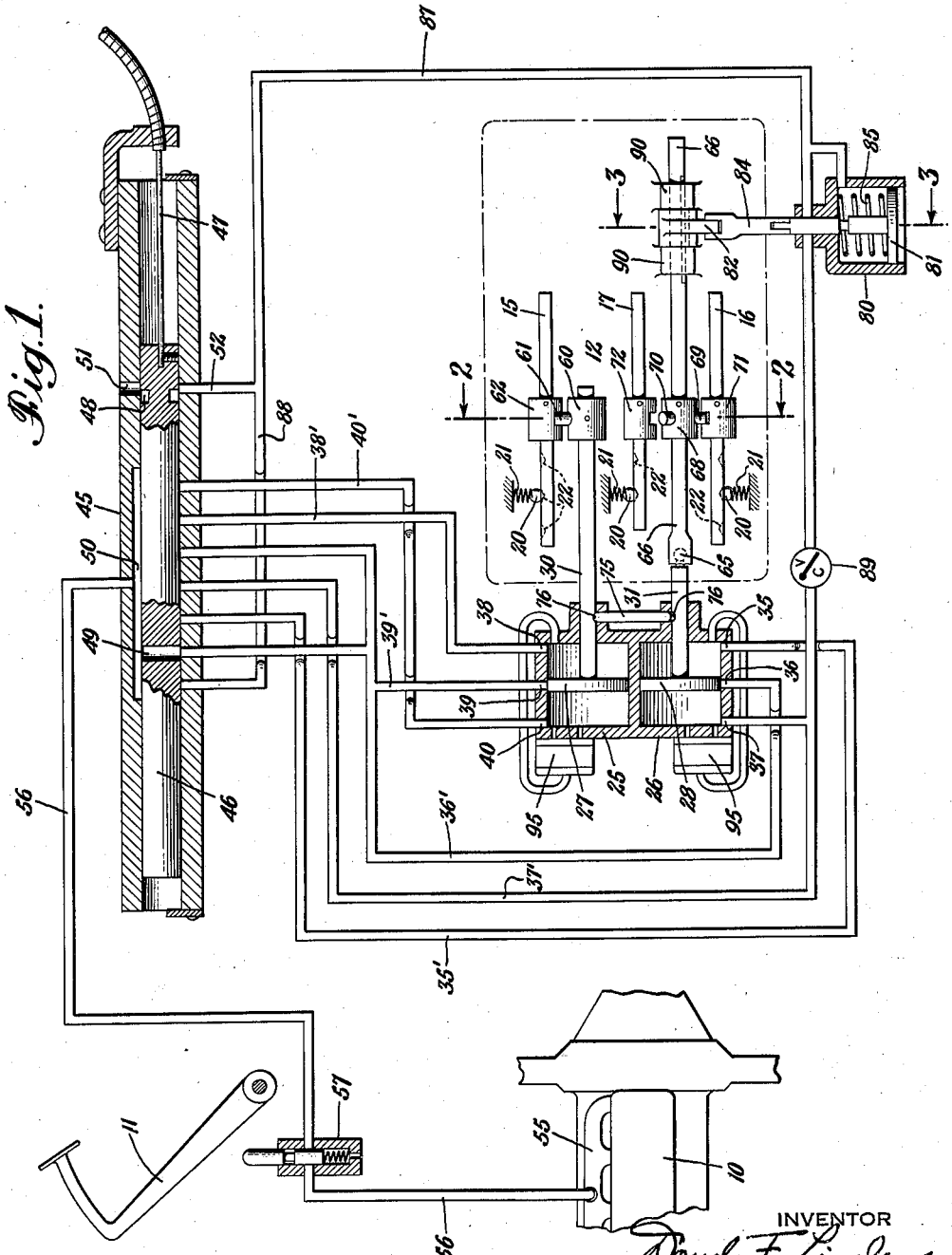

March 15, 1938.　　　D. F. LINSLEY　　　2,110,994
AUTOMOTIVE VEHICLE
Filed April 3, 1936　　　2 Sheets-Sheet 2
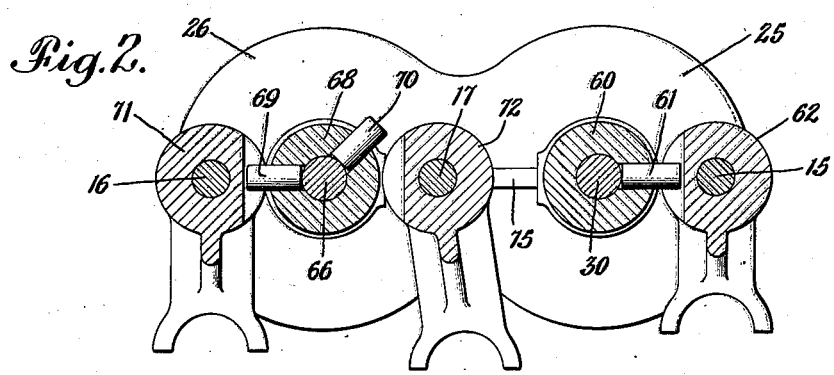
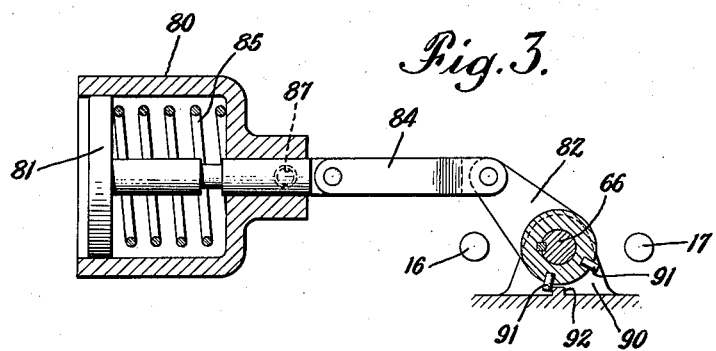
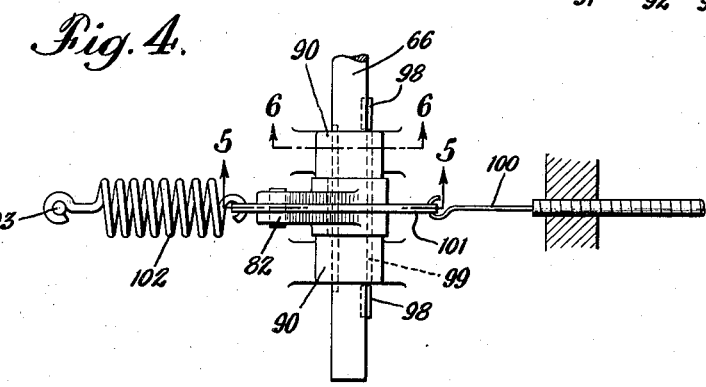
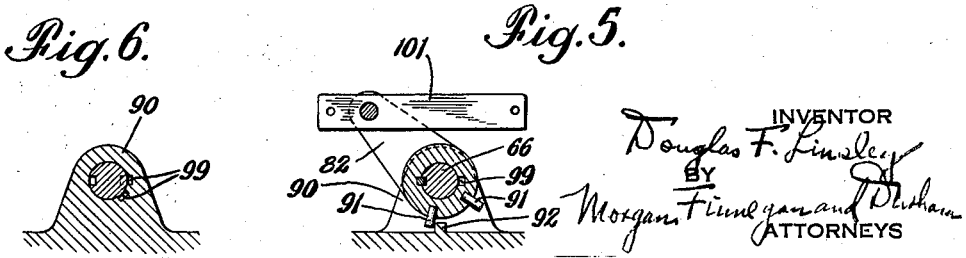

Patented Mar. 15, 1938

2,110,994

UNITED STATES PATENT OFFICE 2,110,994

AUTOMOTIVE VEHICLE

Douglas F. Linsley, Norwalk, Conn., assignor to Vaco Products, Inc., a corporation of Delaware Application April 3, 1936, Serial No. 72,491

9 Claims. (Cl. 74—334)

The present invention relates to fluid pressure operated gear shifting devices and more particularly to a novel and improved gear shifting device particularly adapted for use with transmissions having four forward speeds and a reverse speed.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a diagrammatic view illustrating a typical embodiment of the invention as applied to an automotive transmission having four forward speeds and a reverse speed;

Figure 2 is a sectional view taken on the line 2—2 of Figure 1 and shows the connection between the piston rods and the gear shifting rods;

Figure 3 is a sectional view taken on the line 3—3 of Figure 1 and showing the selecting device for alternatively connecting one piston rod with either of two gear shifting rods;

Figure 4 is a fragmentary plan view of a modified and alternative form of gear shift rod selecting device;

Figure 5 is a sectional view taken on the line 5—5 of Figure 4; and

Figure 6 is a sectional view taken on the line 6—6 of Figure 4.

The present invention has for its object the provision of a novel and improved gear shifting device particularly adapted for the fluid pressure shifting of a four speed and reverse automotive transmission. A further object of the invention is the provision of a fluid pressure gear shifting device in which a lesser number of fluid pressure cylinders and pistons are provided than there are gear shifting rods in the transmission operated thereby. Another object is the provision of an improved interlocking device preventing incorrect or faulty operation of the gear shifting device and thereby preventing injury to the transmission. Still another object is the provision of a gear shifting device in which a selector valve controls not only the application of suction or other fluid pressure to the gear shifting elements, but also controls the selection of which of the gear shifting elements are to be operated.

In accordance with the present embodiment of the invention there is provided a gear shifting device for use with an automotive selective gear transmission having four forward and one reverse speeds and operated by fluid pressure such as the suction developed by the intake manifold of the vehicle-propelling internal combustion engine. The shiftable gear transmission is provided with three gear shifting rods, and for actuating these rods there are provided two double-acting fluid pressure operated motors each of which may be moved by the fluid pressure to any one of three positions, one of the motors being connected to one of the shift rods, while the other is alternatively connectible to either of the other two shift rods. Interlock means are provided for preventing movement of one motor except while the other motor is in a particular condition, and other means are provided for preventing the alternative connection of the one motor to its other shift rod except when it is in a particular condition. Manual or fluid pressure means are provided for effecting this alternative shifting from one shift rod to the other of the motor connection, and a selector valve is provided for controlling the application of fluid pressure to the various fluid pressure operated devices as required for the particular operation to be performed. Automatic venting valves are provided for the double-acting fluid pressure-operated motors, and means are provided for normally shifting the alternative connection of the one motor to a normal position. Other means are provided for preventing the application of fluid pressure to the motors except when the clutch has been conditioned for gear shifting.

It will be understood that the foregoing general description and the following detailed description as well are exemplary and explanatory of the invention but are not restrictive thereof.

Referring now in detail to the illustrative embodiment of the invention as shown by Figures 1, 2 and 3 of the accompanying drawings, there is provided the conventional internal combustion engine 10 for propelling the automotive vehicle and the application of power to the vehicle wheels is controlled by a clutch to be engaged and disengaged by clutch pedal 11, while the gear ratio between the engine and wheels is selectively varied by a four speed and reverse shiftable gear transmission 12. As is usual with such a transmission, there are provided three gear shifting rods, 15, 16 and 17. Rod 15 serves to shift the gears from neutral to third or fourth speed; rod 16 serves to shift the gears from neutral to first or second speed; while rod 17 serves to shift the gears from neutral to reverse speed position. Ball detents 20 are pressed by springs 21 into recesses 22 in the gear shifting rods which correspond to the various speed positions of the gear shifting rods.

For the power shifting of the gear shifting rods 15, 16 and 17, there are provided two double acting fluid pressure motors 25 and 26 each of which comprises a double-ended cylinder within which is a piston 27, 28 connected to one end of its piston rod 30, 31. At each end and centrally of each cylinder 25, 26 is provided a port by which fluid pressure may be selectively applied to either end or the center of either cylinder. First speed port 35, neutral port 36, second and reverse speed port 37, third speed port 38, neutral port 39 and fourth speed port 40 are connected by their individual pipes 35', 36', 37', 38', 39', and 40' to the selector valve by which the application of fluid pressure to the several ends of the cylinder is controlled, thereby controlling the movement of the pistons accordingly. Neutral lines 36' and 39' are interconnected so that the application of suction to either of these lines causes a similar application of suction to the other line.

As illustratively shown, the selector valve comprises a valve body 45 within which is slidable a valve slide 46 moved by suitable controlling means such as the push-pull wire 47. Valve slide 46 is provided with ports 48 and 49, port 49 being adapted to interconnect the elongated port 50 with one or the other of the ports corresponding to lines 35', 36', 37', 38', 40' and 41', while port 48 is adapted to connect venting port 51 with port 52. Port 50 is connected to the source of fluid pressure, such as the intake manifold 55, by means of line 56 which is controlled by the normally closed clutch operated valve 57 serving to prevent the application of suction except when the clutch is fully disengaged.

For connecting piston rod 30 to its gear shifting rod 15, the outer end of the rod 30 is provided with a collar 60 and laterally extending pin 61 to engage in a slot formed in a collar or shifting fork 62 on the rod 15, and rods 15 and 30 are thereby moved similarly and parallel to each other.

At the end of piston rod 31 is a ball and socket joint 65 connecting this rod with its extension 66, and the extension is provided with a collar 68 having two laterally projecting and angularly spaced-apart pins 69 and 70 which are alternatively engageable with corresponding slots in the collars or forks 71 and 72 on shift rods 16 and 17 respectively. With pin 69 engaging collar 71, rod 16 is moved similarly and proportionally to piston rod 31, while with pin 70 engaging the slot in collar 72, the same effect is produced on rod 17.

Means are provided for preventing movement of either piston rod 30 and 31 while the other is not in neutral position, and for this purpose, an interlock bar 75 is slidably mounted on the end of cylinders 25 and 26 and engages in the notch 76 of one rod or the other, the notch 76 in each rod being of sufficient depth to receive the bar 75 and permit the movement of only one of the rods.

Other means are provided for shifting the pins 69 and 70 from forward to reverse speed position and for doing this only when the shift rods 16 and 17 are both in neutral position. As embodied, there is provided a small cylinder 80 having a piston 81 reciprocable therein, connected by link 84 to arm 82 which is splined to rod 66 and is slidable relatively thereto. A spring 85 normally maintains the arm 82 and rod 66 in forward speed position, but as suction is applied to the cylinder 80 through lines 87 and 88, piston 81 is moved against the compression of spring 85 to shift the arm 82 and rod 66 to reverse position after which the suction is applied to the left end of cylinder 26 through port 37 and check-valve 89. Check-valve 89 at other times prevents the venting of line 37 through line 87 and port 52. Guide bosses 90 prevent longitudinal movement of the splined arm 82, while pins 91 on arm 82 cooperate with stop 92 to prevent arm 82 throwing too far.

For venting the cylinders 25 and 26 as their pistons are moved under the influence of the intake manifold suction, automatic venting valves 95 are provided, each of the valves being adapted to vent one end of the cylinder when suction is applied to the other end of the cylinder, the valve being lifted from its seat by the suction in the other end of the cylinder. As these valves are fully shown and described in my prior Patent No. 1,733,502 they need not be further described or shown here.

Referring now to Figures 4, 5 and 6 illustrating a modified form of the invention in which the reverse connection of rod 66 to the reverse shift rod 17 is accomplished manually, rod 66 is provided with keys 98 which are adapted to enter one or the other of the keyways 99 formed in the boss 90 and thereby positively prevent turning of the rod 66 except when it is in neutral position. For manually turning the rod from forward to reverse position, a pull wire 100 is connected to one end of link 101 which is pivotally connected to the end of arm 82, while the other end of the link is connected to the end of a tension spring 102 anchored to the transmission cover by pin 103. The other end of wire 100 may be conveniently located in the vicinity of the operator, so that by pulling of the wire while the gears are in neutral, he may rock the shaft 66 to reverse position and by moving the selector valve, shift the gears to reverse position.

In the operation of the first embodiment, the operator wishing to start the vehicle in motion, moves the selector valve to first speed position, thereby applying suction to the port 35 when the clutch is disengaged and moving the piston 28 to the right with pin 69 in engagement with the shifting collar 71 to shift the gears into first speed position. As suction is applied to this end of the cylinder, automatic valve 95 vents the left side of the cylinder 26 to permit free movement of the piston.

The operator then moves the valve to second speed position applying suction through port 37 to move the piston to the left and shift the gears into second speed. Venting of the line 37' is prevented by check valve 89, and venting of the first speed side of the cylinder 26 is accomplished by automatic valve 95.

For third speed, the operator depresses the clutch and moves the selector valve through neutral position and to third speed, shifting piston 28 to neutral and then shifting piston 27 to third speed position. Interlock 75 prevents the movement of piston 27 until the piston 28 is in neutral position.

For fourth speed, the selector valve is again moved with the clutch disengaged so as to apply suction to port 40 to move the piston 27 and shift rod 15 to the left.

For reverse, the operator disengages the clutch by pedal 11, stops the vehicle, and moves the selector valve first to the position shown in Figure 1, and then to its extreme left position, first placing the gears in neutral and thereafter applying suction to lines 87 and 88 to move the piston 81. This movement rocks the rod 66 to engage pin 70 with shifting collar 72 and then the suction moves the piston 28 to the left to shift the gears into reverse speed position. When it is desired to shift to a forward speed, the selector valve is moved to the desired position, passing through the neutral port 36 at which time the piston 81 is returned to its normal position by spring 85 as cylinder 85 is vented through port 51.

The operation of the embodiment shown in Figures 4, 5 and 6 is substantially the same, except that with this form, and with the gears in neutral position, the operator pulls wire 100 against spring 102 to rock arm 82 into reverse position, and then with the selector valve in reverse position, the gears are shifted to reverse speed by disengagement of the clutch.

The invention in its broader aspects is not limited to the specific mechanisms shown and described but departures may be made therefrom within the scope of the accompanying claims without departing from the principles of the invention and without sacrificing its chief advantages.

What I claim is:—

1. In a fluid pressure operated gear shifting device for use with a transmission having three gear shifting members, the combination of a pair of double acting fluid pressure operated cylinders with pistons therein, means for preventing operation of more than one piston at a time, means connected to one piston for alternatively operating either of two of the shifting members and means connected to the other piston for operating the other shifting member.

2. In a fluid pressure operated gear shifting device for use with a transmission having three gear shifting members, the combination of a pair of double acting fluid pressure operated cylinders with pistons therein, means for operating one shifting member by one piston, means for alternatively operating either of two shifting members by the other piston and means for selectively applying fluid pressure to the cylinder ends for selectively actuating said shifting members.

3. In a fluid pressure operated gear shifting device for use with a transmission having three gear shifting members, the combination of a pair of double acting fluid pressure operated cylinders with pistons therein, means operating one shifting member by one piston, means for alternatively operating either of two shifting members by the other piston, means for selectively applying fluid pressure to the cylinder ends for selectively actuating said shifting members and means operated by the application of fluid pressure to one cylinder end for determining the alternative operation of the second means.

4. In a fluid pressure operated gear shifting device for use with a transmission having three gear shifting members, the combination of a pair of double ended cylinders each having a piston therein, a connection between one of the pistons and a pair of the members for alternatively connecting either of the members to the piston means connecting the other piston to the other member, and manually controlled means for selecting the member to be operated.

5. In a fluid pressure operated gear shifting device for use with a transmission having three gear shifting members, the combination of a pair of double ended cylinders each having a piston therein, a connection between one of the pistons and a pair of the members for alternatively connecting either of the members to the piston means connecting the other piston to the other member, and fluid pressure operated means for shifting the connection from one of the members to the other.

6. In a fluid pressure operated gear shifting device for use with a transmission having three gear shifting members, the combination of a pair of double ended cylinders each having a piston therein, a connection between one of the pistons and a pair of the members for alternatively connecting either of the members to the piston means connecting the other piston to the other member, and manually controlled means for selecting the member to be operated, said fluid pressure operated means being selectively energized by the pressure applied to one end of the cylinders.

7. In a fluid pressure operated gear shifting device for use with a transmission having three gear shifting members, the combination of a pair of double ended cylinders each having a piston therein, a connection between one of the pistons and a pair of the members for alternatively connecting either of the members to the piston means connecting the other piston to the other member, fluid pressure operated means for shifting the connection from one member to the other and a selector valve for applying pressure to either end of the cylinder or to one cylinder end and to said fluid pressure operated means.

8. In a fluid pressure operated gear shifting device for use with a transmission having three gear shifting members, the combination of a pair of double ended cylinders each having a piston therein, a connection between one of the pistons and a pair of the members for alternatively connecting either of the members to the piston means connecting the other piston to the other member, and manually controlled means for selecting the member to be operated, and means preventing shifting of said connection except in one position of the piston.

9. A fluid pressure operated gear shifting device for use with an automotive transmission having four forward and one reverse speeds selectively operated by three shifting members including in combination a pair of double ended cylinders having pistons therein and movable to either end of the cylinders or to the center of the cylinders, interlock means preventing movement of either rod while the other is away from its central position, automatic venting valves for each cylinder end selectively operated by the pressure in the other end of the cylinder, means for alternatively and selectively connecting one piston to either of two shifting members, means connecting the other piston to the other shifting member, a fluid pressure operated means for shifting said alternative connection, a selector valve for selectively applying fluid pressure to said cylinder ends, means for applying fluid pressure to said fluid pressure shifting means under control of the selector valve, means preventing shifting of the alternative connection when the corresponding piston is away from a particular position and means for restoring said shifting means to a normal position.

DOUGLAS F. LINSLEY.